(12) United States Patent
Tetro et al.

(10) Patent No.: US 6,715,672 B1
(45) Date of Patent: Apr. 6, 2004

(54) SYSTEM AND METHOD FOR ENHANCED FRAUD DETECTION IN AUTOMATED ELECTRONIC CREDIT CARD PROCESSING

(76) Inventors: Donald Tetro, 6401 Rodeo Dr., Fort Lauderdale, FL (US) 33330; Edward Lipton, 1600 S. Ocean Dr., Fort Lauderdale, FL (US) 33316; Andrew Sackheim, 11500 SW. 22$^{nd}$ Ct., Davie, FL (US) 33024

( * ) Notice: Subject to any disclaimer, the term of this patent is extended or adjusted under 35 U.S.C. 154(b) by 0 days.

(21) Appl. No.: 10/278,620

(22) Filed: Oct. 23, 2002

(51) Int. Cl.$^7$ .................................................. G06K 5/00
(52) U.S. Cl. ........................ 235/380; 235/379; 235/382; 902/5; 902/25
(58) Field of Search ................................ 235/379, 380, 235/382; 902/5, 25

(56) References Cited

U.S. PATENT DOCUMENTS

| | | |
|---|---|---|
| 3,872,438 A | 3/1975 | Cuttill et al. |
| 4,123,747 A | 10/1978 | Lancto et al. |
| 4,317,957 A | 3/1982 | Sendrow |
| 4,439,670 A | 3/1984 | Basset et al. |
| 4,472,626 A | 9/1984 | Frid |
| 4,498,000 A | 2/1985 | Decavele et al. |
| 4,594,663 A | 6/1986 | Nagata et al. |
| 4,656,342 A | 4/1987 | Ugon |
| 4,801,787 A | 1/1989 | Suzuki |
| RE32,985 E | 7/1989 | Nagata et al. |
| 4,947,027 A | 8/1990 | Golightly |
| 4,947,028 A | 8/1990 | Gorog |
| 5,012,077 A | 4/1991 | Takano |
| 5,163,086 A | 11/1992 | Ahearn et al. |
| 5,177,342 A | 1/1993 | Adams |
| 5,202,826 A | 4/1993 | McCarthy |
| 5,223,699 A | 6/1993 | Flynn et al. |
| 5,231,569 A | 7/1993 | Myatt et al. |
| 5,311,594 A | 5/1994 | Penzias |
| 5,365,046 A | 11/1994 | Haymann |
| 5,426,281 A | 6/1995 | Abecassis |
| 5,457,305 A | 10/1995 | Akel et al. |
| 5,500,513 A | 3/1996 | Langhans et al. |
| 6,095,413 A | 8/2000 | Tetro et al. |

*Primary Examiner*—Michael G. Lee
*Assistant Examiner*—Kimberly Nguyen

(57) ABSTRACT

A method and system for authorizing an electronic credit card transaction having enhanced measures for detecting fraudulent transactions. A user at a remote terminal attempting to conduct an electronic credit card transaction is prompted to input the user's name credit card information, address, and only a portion of the user's social security number. The information input by the user is retrieved and used for identification purposes. Initially, the input credit card information is submitted to an issuer of the user's credit card to determine whether the input credit card information is valid. A second independent database having a stored list of individuals is further accessed, wherein each of the individuals includes at least one associated address stored therewith. The addresses stored in association with an individual found to match the user input information are retrieved and compared with the user input address to determine if the input address corresponds to any of the retrieved stored addresses. If the input credit card information has been confirmed by the issuer as being valid and the address input by the user matches any of the retrieved addresses stored in the second independent database, the electronic credit card transaction is authorized and allowed to transpire.

25 Claims, 5 Drawing Sheets

SYSTEM AND METHOD FOR ENHANCED FRAUD DETECTION IN AUTOMATED ELECTRONIC CREDIT CARD PROCESSING

BACKGROUND OF THE INVENTION

1. Field of the Invention

The present invention relates generally to credit card verification processes, and specifically to an improved automated system and process for detecting and preventing the fraudulent use of credit cards by unauthorized users.

2. Description of Related Art

Credit cards have conventionally been used for financial transactions for reasons of public convenience and economy. Typically, a purchaser merely needs to present the credit card to a vendor to complete a transaction, where all information necessary to complete the financial transaction is contained on the credit card. Credit cards inherently possess a certain degree of risk for fraudulent use, since the credit card information necessary for the financial transaction appears on the face of the credit card. Thus, if a credit card is lost or stolen, an unauthorized user of the credit card may complete financial transactions by merely presenting the credit card number to a vendor. In order to prevent unauthorized use of a credit card, vendors have conventionally asked for picture identification or compared the purchaser's signature with a signature on the card to ensure the purchaser is an authorized user of the card. However, such authorization techniques can only be performed when the purchaser is in the presence of the vendor. Recently, there has been a trend toward performing credit card transactions electronically over computer networks via the "Internet" or phone lines via audiotext systems or from remote communication devices. In such electronic credit card transactions, the purchaser inputs the credit card information from a remote terminal, such as a computer terminal or telephone keypad, and this information is transmitted to the vendor. Prior authorization techniques used for in-person transactions can not be used with electronic credit card transactions, so new security measures are required to prevent fraudulent and unauthorized electronic credit card transactions.

One type of security measure developed for electronic credit card transactions is the verification of the billing address of the credit card bolder. The purchaser is required to input his billing address along with his credit card information through the remote terminal. The financial institution issuing the credit card has the billing address for each of its credit card holders stored along with the associated credit card information in a database of credit card holders' accounts. When the credit card information is presented to the financial institution from the vendor for authorization, the stored billing address associated with the credit card number submitted for authorization is compared with the billing address input by the purchaser to ensure they match. If the addresses do not correlate, then the purchaser is deemed to be an unauthorized user and the credit card transaction is denied. However, address verification systems of this type are not entirely effective in preventing unauthorized use. Individuals usually carry their credit cards in their wallets along with other personal identification, such as the individual's driver's license. A thief who steals the individual's wallet will have access to the individual's personal identification as well as their credit card, so that the thief will know the credit card holder's address and will be able to satisfy the address verification test during the authorization procedure. Thus, address verification systems have not been successful in entirely eliminating fraudulent usage of credit cards.

Another security measure developed to prevent fraudulent electronic credit card transactions is the use of automated number identification (ANI) blocking. Since almost all electronic credit card transactions are performed from remote terminals connected through telephone lines, the vendor automatically collects the telephone number associated with the telephone line of the remote device from the telephone carrier. The vendor possesses a stored list of telephone numbers associated with a pattern of fraudulent use, wherein the ANI collected is compared with the stored list to determine if a match exists. If the ANI collected is on the stored list, then that telephone line is blocked from further use. ANI blocking is effective in preventing continued fraudulent usage of a credit card from a particular phone number. However, ANI blocking is also of limited usefulness, because it correlates a telephone number used on one occasion for a fraudulent credit card transaction as a blocked phone number. Even though the telephone number and credit card are not interrelated, the telephone number will be blocked from any further credit card transactions. The next electronic credit card transaction attempted using that telephone number may be a valid transaction, but the transaction will be denied since the telephone number has been blocked by ANI blocking. Thus, remote terminals frequently having a plurality of different users, such as hotel room telephones or pay phones, will be blocked by ANI blocking by one fraudulent use, preventing subsequent valid credit card transactions from being performed from that remote terminal. While ANI blocking is effective in preventing repeated fraudulent credit card transactions from occurring from the same remote terminal, it also has the detrimental effect of preventing subsequent valid credit card transactions from being performed from the same remote terminal.

There has been a need for a method for preventing fraudulent electronic credit card transactions which does not also incidentally prevent subsequent valid credit card transactions from being performed. Moreover, there was a need for a more secure method for preventing fraudulent electronic credit card transactions by requiring identifying data that is not easily attainable by a fraudulent user. In order to accomplish these needs, U.S. Pat. No. 6,095,413, issued to the same inventors as the present invention and assigned to common assignees as the present invention, provides a system for authorizing a credit card transaction which requires a person attempting a credit card transaction to provide certain credit card information as well as their social security number. After verifying the credit information provided is correct, this system then accesses a separate social security number database which contains a list of social security numbers and respective addresses associated with the stored social security numbers. The addresses stored in associated with the social security number provided by the user are retrieved from the social security number database and compared with the address provided by the user. Authorization of the credit card transaction is then authorized if the information provided by the purchaser is corroborated by the information in the social security number database In this manner, personally identifying information about an individual which is not readily ascertainable by another person is required to complete the credit card transaction.

While the credit card authorization system described in U.S. Pat. No. 6,095,413 has proven to be very effective in preventing fraudulent credit card transactions, the inventors of the present invention have found this type of credit card authorization system to also deter individuals from making otherwise valid purchases due to their reluctance to provide their social security number. A social security number particularly identifies an individual for their lifetime, where an individual's social security number is typically only known by the individual himself. Therefore, various entities will often utilize social security numbers as a type of secret identifying information for the individual, such as a password, student loan account number, etc. Due to the personal and highly secretive nature of social security numbers, individuals are reluctant to reveal their social security number to complete a purchase, especially when the credit card transaction is being attempted with a remote party via the Internet. This can cause reluctant individuals to decide against making the purchase in order to maintain the secrecy of their social security number. Thus, this type of system has the detrimental effect of deterring otherwise valid credit card transactions from occurring.

Clearly, there is a need for an effective method of preventing fraudulent electronic credit card transactions which does not also incidentally deter otherwise valid credit card transactions from being performed.

OBJECTS AND SUMMARY OF THE INVENTION

The present invention provides a system and method for enhanced fraud detection in automated electronic credit card processing which minimizes the number of fraudulent electronic credit card transactions without deterring otherwise valid credit card transactions from being performed. A user at a remote terminal, such as a telephone or personal computer, attempting to conduct an electronic credit card transaction is prompted by the automated electronic credit card processing system of the present invention to input the user's credit card information and personal information about the user, such as the user's name, address, or a portion of their social security number. The information input by the user is retrieved and used for identification purposes. Initially, the input credit card information is communicated to an issuer of the user's credit card to determine whether the input credit card information is valid. Once the credit card information is validated by the issuer, the other information input by the user is checked against a second independent information database to corroborate the information input by the user and the information contained in the database maintained by the credit card issuer.

The independent information database contains a list of individuals along with at least one address stored along with each respective individual. The name input by the user is compared with the names of the individuals contained in the independent information database to determine if a match exists. When a match is found, the addresses stored in association with this name in the independent information database are retrieved. The input address is then compared with the retrieved stored addresses to determine if the input address corresponds to any of the retrieved stored addresses. If the input credit card information has been confirmed by the issuer as being valid and the address input by the user matches any of the retrieved addresses stored in association with the user's name in the independent information database, the electronic credit card transaction is authorized and allowed to transpire. The electronic credit card transaction is denied when any of the tests performed are not satisfied, and the user is notified the reason for which the credit card transaction is refused. The independent information database is stored and accessed separately from the issuer's credit card information database to provide an added measure of protection by corroborating the information stored in both databases.

In an alternative embodiment of the present invention, the independent information database contains social security number information stored in association with the list of individuals stored therein. The social security number information input by the user, i.e., the last four digits or other portion of the user's social security number, is used either alone or in conjunction with the name input by the user to determine whether these pieces of user input information correspond to an individual stored in the independent information database. If a match is found to exist, the addresses stored in association with the input social security number information are then retrieved. The input address is compared with the retrieved stored addresses to determine if the input address corresponds to any of the retrieved stored addresses. If the address input by the user matches any of the retrieved addresses stored in association with the input social security number information, the electronic credit card transaction is authorized for use.

As a further fraud detecting measure, the electronic credit card processing system may collect the phone number from which the remote terminal is communicating. The collected phone number is compared with a stored list of blocked phone numbers which are not authorized to perform electronic credit card transactions. The electronic credit card transaction could then be rejected if the collected phone number matches any of the blocked phone numbers on the stored list.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide enhanced fraud detection in automated electronic credit card processing.

Figure 1:
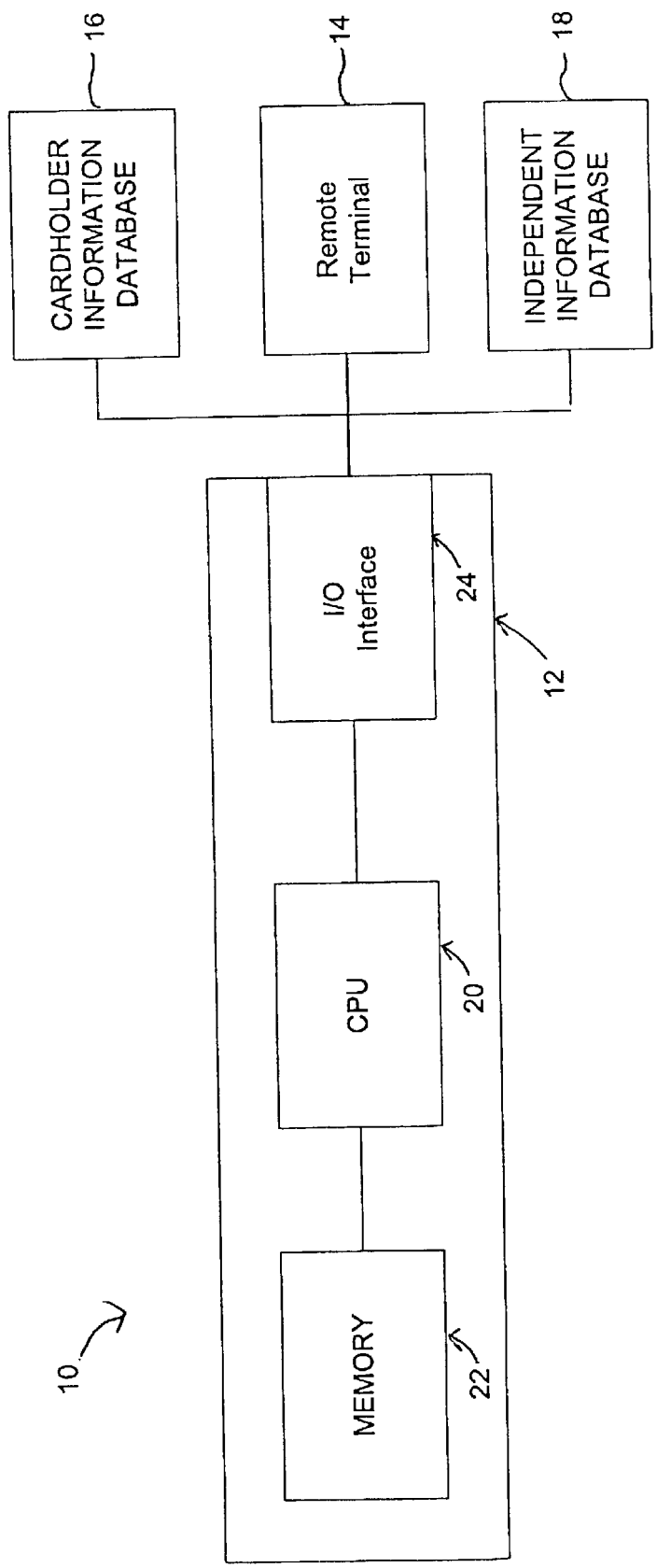
FIG. 1 is a schematic block diagram of a preferred embodiment of the electronic credit card processing system of the present invention.

Referring now to FIG. 1, a schematic block diagram of the components of the electronic credit card processing system 10 of the present invention is illustrated. The system 10 includes a central station 12, a remote terminal 14, a cardholder information database 16 of an issuer of a credit card, and an independent information database 18. Central station 12 includes a processing unit 20, memory 22, and input/output (I/O) interface 24. Software for performing the method of enhanced fraud detection of the present invention may be stored in memory 22 and executed by processing unit 20. Processing unit 20 may include a central processing unit (CPU), microprocessor, or other similar processing device. Central station 12 is connected to remote terminal 14, cardholder information database 16, and independent number information database 18 via communication links, such as telephone lines, optical links, RF links, digital transmission links, or any other data transmission technique.

Figure 2:
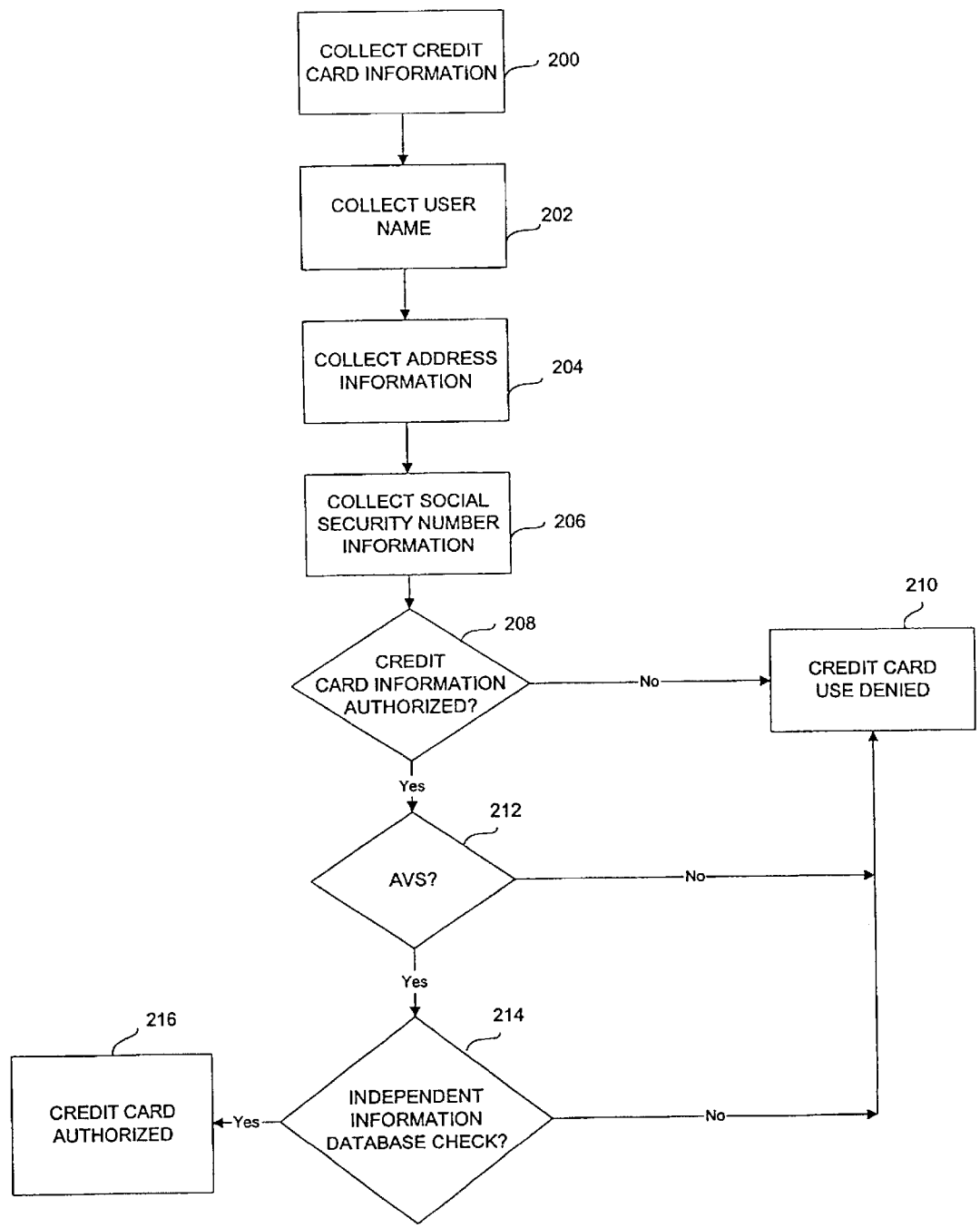
FIG. 2 is an operational block diagram of a preferred method of the present invention for enhanced fraud detection in electronic credit card processing.

The operation of the electronic credit card processing system 10 is illustrated in the flow diagram of FIG. 2. A user at remote terminal 14 attempting to make a purchase by performing an electronic credit card transaction is connected to communicate with central station 12. Remote terminal 14 may include a telephone, personal computer, wireless computing device, personal data assistant (PDA), or any other device through which data may be input and transmitted to central station 12. The user is prompted to input the user's credit card information, full name, billing address in steps 200, 202, and 204, respectively. The user may optionally be prompted to further provide a portion of the user's social security number in step 206 in order to provide an added level of security. It also the intention of the inventors of the present invention that the information collected from the user may be previously collected from the user or collected from other sources other than the user being prompted to input the information at the time of making a purchase.

From instructions from a program stored in memory 22, processing unit prompts the user in step 200 to input credit card information identifying the user's credit card account, such as the credit card number and expiration date of the credit card. In step 202, the user is prompted to input his/her full name. In step 204, the user is prompted to input the billing address associated with the credit card account. The amount of address information requested may be varied according to the level of security desired during the verification procedure, where higher degrees of security are obtained with when requesting larger amounts of address information. For instance, the user may be prompted to merely enter his zip code for a cursory verification, or may be prompted to enter his full billing address for a more detailed verification. Steps 200–204 may be performed either simultaneously with one another or in sequential fashion.

When additionally utilizing social security number information, the user is also prompted to input social security number information in step 206. Due to the reluctance of individuals to provide their social security number to others, only a portion of the user's social security number is requested. For instance, only the last four digits of the social security number is requested or another portion of the social security number. The input credit card information, input name, input billing address, and input social security number information are transmitted to and received by central station 12, where such information is stored in memory 22. The information input by the user is later retrieved from memory 22 and used for identification purposes.

In order to confirm that valid credit card information has been provided by the user, the input credit card information is submitted to an issuer of the user's credit card in step 208. The issuer possesses a database 16 containing information relating to the credit card accounts for each of its issued credit cards, such as the credit card numbers, expiration dates, billing addresses, and credit limits of its cardholders. A comparison is made between the input credit card information and the stored credit card information in cardholder information database 16 to ensure the input credit card information corresponds to a valid account authorized for the particular transaction being sought. This comparison may be performed either directly by the issuer or by CPU 20 if the cardholder information is communicated back from the issuer to central station 12. If a valid credit card number has not been input by the user, the electronic credit card transaction is denied in step 210. If the input credit card information corresponds to a credit card account in the cardholder information database 16, then the billing address input by the user is compared with a billing address stored in association with the credit card account in cardholder information database 16 in step 212. The credit card transaction is denied in step 210 if the address input by the user fails to correspond to the stored address, whereas the credit card is authorized by the issuer for the transaction when the input and stored addresses correspond.

Once the credit card information is validated by the information provided by the credit card issuer, the electronic credit card processing system then corroborates the information provided by the user with information stored in an independent information database 18 in step 214. The independent information database 18 contains a list of individuals along with at least one address stored along with each respective individual. There may be multiple addresses associated with each individual stored in independent information database 18. Independent information database 18 is a reliable database which contains accurate and up-to-date address information about individuals. The independent information database 18 is stored and maintained separately from the cardholder information database 16.

Figure 3:
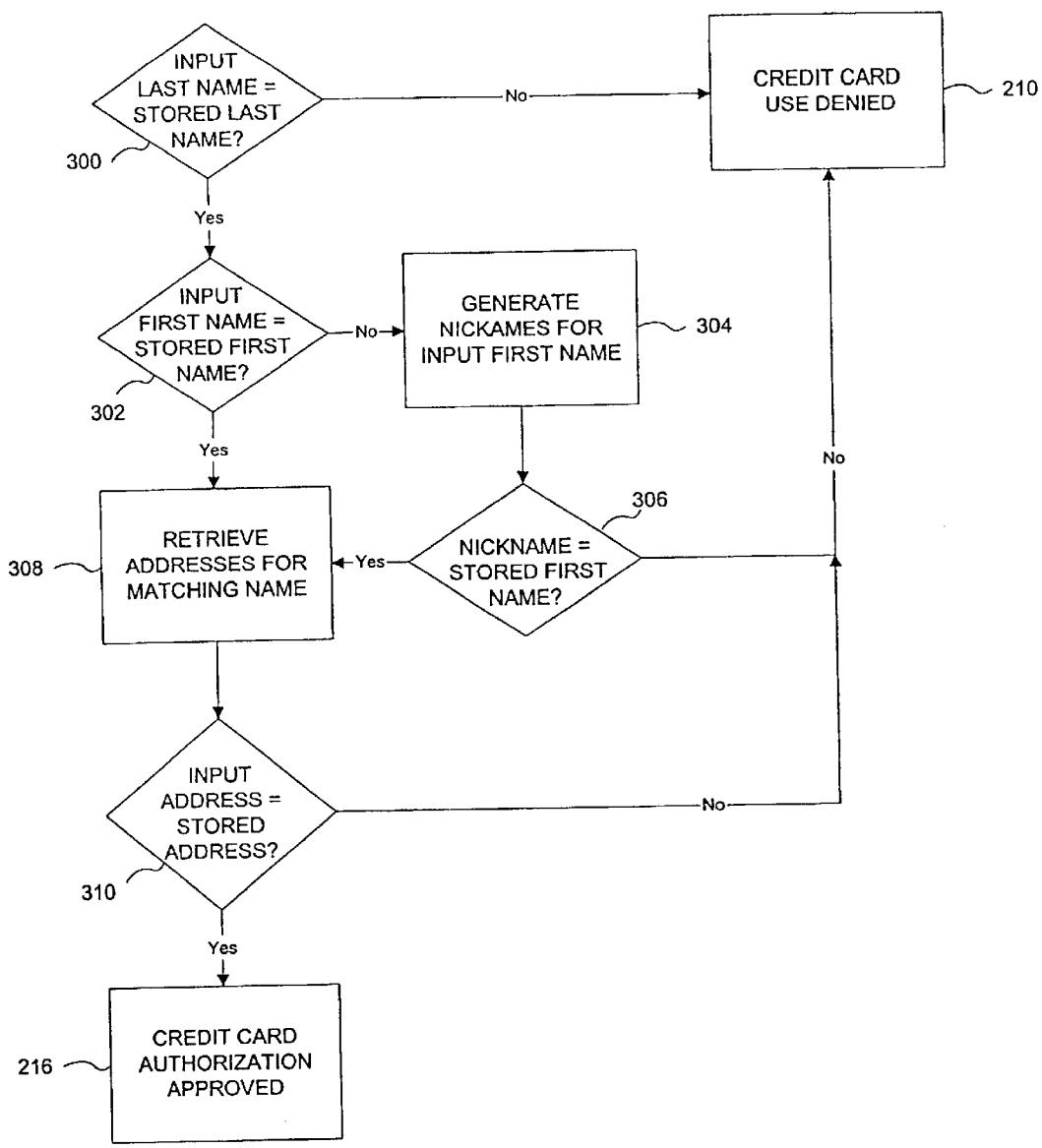
FIG. 3 is an operational block diagram of a method of determining whether information input by a user corresponds to information stored in an independent information database in accordance with a preferred embodiment of the present invention.

Referring now to FIG. 3, the independent information database 18 comparison procedure performed in step 214 will be described in greater detail. Initially, the name input by the user is compared with the names of the individuals contained in the independent information database 18 to determine if a match exists. The first and last name of the user may either be input into a single field or into separate fields. If the first and last names are input into a single field, the electronic credit card processing system 10 will perform the steps of splitting the first and last names into separate fields. For instance, it is assumed that the user's first name precedes the user's last name with the names being separated by one or more blanks. Once the first and last names are properly separated into separate fields, the input last name is compared for an exact match with the last names stored in independent information database 18 in step 300. In performing this comparison, all letters in the last name are mapped to uppercase and all punctuation is removed from the input and stored last names. If there is not an exact match with a last name stored in the independent information database 18, then the electronic credit card transaction is denied in step 210.

If each letter in the input last name matches that of a stored last name, then the input first name is checked against each of the first names associated with a matched last name to determine whether the input first name also matches in step 302. The input first name and the stored first names are mapped to uppercase and all punctuation is removed from the input and stored first names. If the input first name matches any of the first names stored in independent information database 18 in association with a matched last name, then the input name is determined to match a name stored in independent information database 18.

If a match is not found between the input first name and a stored first name, then a list of nicknames is generated for the input first name in step 304. The electronic credit card processing system 10 contains a list of nicknames stored in memory 22 that are associated with common proper names. For instance, if the user inputs the first name "William," then the system 10 could retrieve a list of nicknames from memory 22 associated with the proper name "William," such as "Will," "Bill," "Billy," etc. The list of nicknames is then checked against each of the first names associated with a matched last name in the independent information database 18 to determine whether a nickname for the input first name matches any of the stored first names in step 306. If a nickname for the input first name matches any of the first names stored in independent information database 18 in association with a matched last name, then the name input by the user is determined to match a name stored in independent database 18. If none of the nicknames matches a stored first name associated with a matched last name, then there is no match found between the name input by the user and a name stored in the independent database 18 and the electronic credit card transaction is denied in step 210.

Once a name match is found from either of steps 302 or 306, the addresses stored in association with the matched name in independent information database 18 are then retrieved in step 308. In step 310, the address input by the user is then compared with the retrieved addresses to determine whether a match exists. If the input address is found to match an address stored in association with a matched name, the information input by the user is found to be corroborated by independent information database 18 and the electronic credit card transaction is authorized to proceed in step 214. The electronic credit card transaction is denied in step 210 when the input address fails to match any of the stored addresses. In this manner, the input credit card information has been confirmed by the issuer as being valid and the address input by the user has matched an address stored in association with the user's name in the independent information database 18, thus corroborating the information input by the user in two independent databases in order to provide an added measure of fraud detection.

Figure 4:
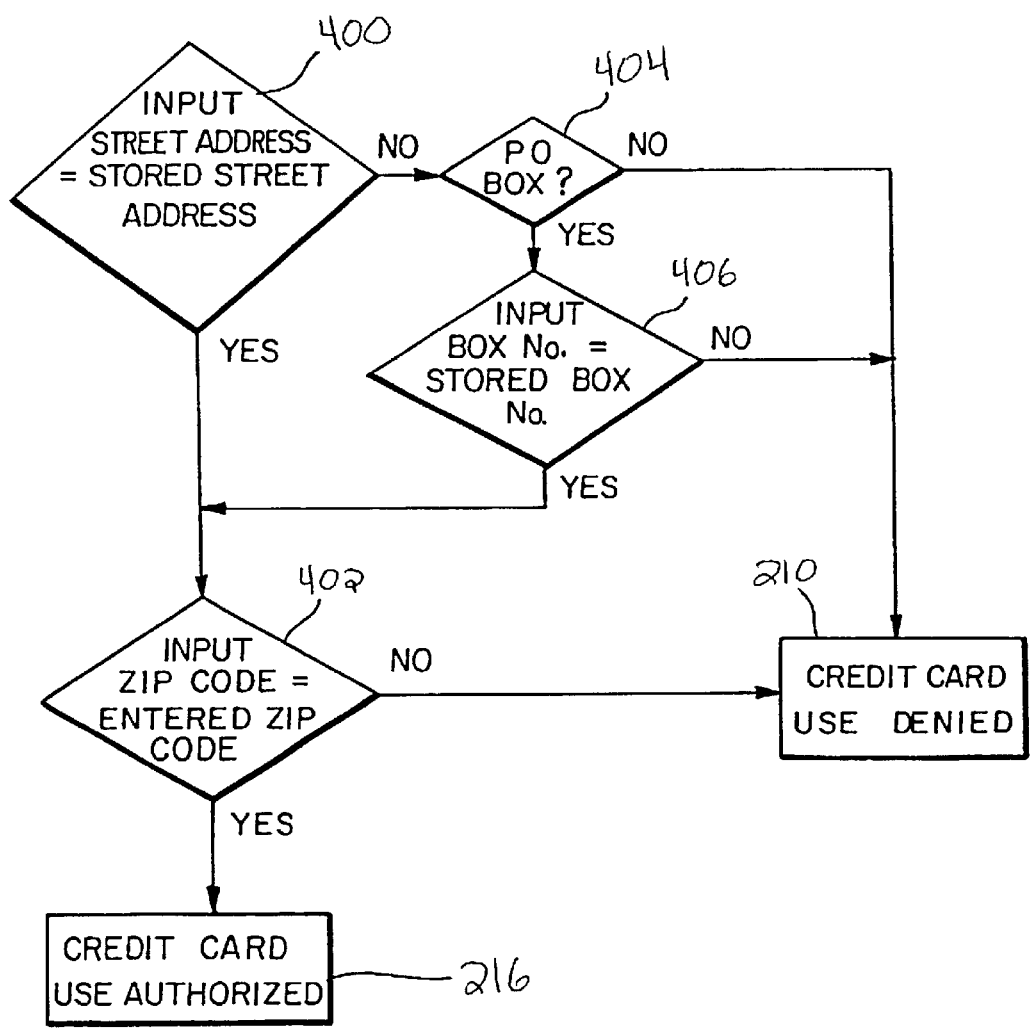
FIG. 4 is an operational block diagram of an address verification procedure in accordance with a preferred embodiment of the present invention.

Referring now to FIG. 4, the address comparison procedure performed in step 310 will be described in greater detail in accordance with a preferred embodiment of the present invention. A typical address has a field containing the actual street address, the name and/or number of the street, the city, the state, and the zip code. For example, "123 45$^{th}$ Street" contains the street address "123" and the street number "45." The user is prompted to input his actual street address, street name/number, and zip code. In step 400, the street address input by the user is compared with the street address contained in the stored addresses retrieved from social security database 18. If the street addresses match, the electronic credit card processing system 10 moves on to step 402 where the zip code input by the user is compared with the zip code contained in the retrieved stored addresses. If the street addresses are different from one another, the input billing address is analyzed to ascertain whether the word "BOX" appears in the input billing address in step 404 in order to determine if the input address is a Post Office Box or APO address. If the word "BOX" is found, the term following "BOX" is assumed to be the box number and the input box number is compared with the box number contained in the retrieved stored addresses in step 406. If either the word "BOX" is not found to be present in the input billing address in step 404 or a match is not found between box numbers in step 406, then it is determined that the input social security number is not related to the credit card and the electronic transaction is denied in step 210.

If a match exists between the input box number and stored box number, the system moves on to step 402 to compare the input zip code with the stored zip code. A typical city, state, and zip code address appears as "Anytown, State 12345." Thus, processing unit 20 determines whether the last term in the city, state, zip code address stored in social security number information database matches the input zip code. If a match exists between the stored zip code and the input zip code, the address verification procedure for the electronic credit card transaction is satisfied and the credit card is authorized for use in step 216. If none of the stored zip codes match the zip code input by the user, the input social security number is deemed to be unrelated to the credit card and the electronic transaction is denied in step 210. In alternative embodiments of the present invention, other variations in the particular address information collected and the manner in which this information is verified may be performed without departing from the spirit and scope of the present invention.

The present invention provides a system 10 and method for detecting and preventing the fraudulent use of credit cards by unauthorized users. The system 10 retrieves information from two separate databases (the credit card information database 16 and the independent information database 18) to verify the accuracy of the information input by the user and to corroborate the information stored in both databases. The credit card database verification procedure essentially verifies that the information provided by a user is the same as that initially provided to and stored by the credit card issuer. However, there is no guarantee that the information provided to the credit card issuer is accurate. The present invention provides added protection against fraudulent information from being initially supplied to a card issuer by performing a corroborating validation using the second independent information database 18. The information retrieved from the independent information database 18 is matched against the user input information, which has already been matched against the information contained in the credit card information database 16. Thus, the independent information database 18 corroborates the accuracy of the information stored in the credit card information database 16. The system and method of authorizing a credit card for use in accordance with the present invention may either authorize the credit card for an immediate purchase transaction or may authorize the credit card for future transactions.

In another preferred embodiment of the present invention, social security number information is utilized in the independent information database 18 as a field of information used identifying an individual stored therein. Social security number information is extremely effective in verifying the information provided by the user and the information contained in the independent information database 18. Every social security number specifically identifies an individual by a number uniquely assigned to each individual, which remains unchanged for the entire life of that individual. Every address associated with an individual throughout his life, i.e. where the individual works or resides, is correlated to an individual stored in the social security number database 18 along with their respective social security number information.

Figure 5:
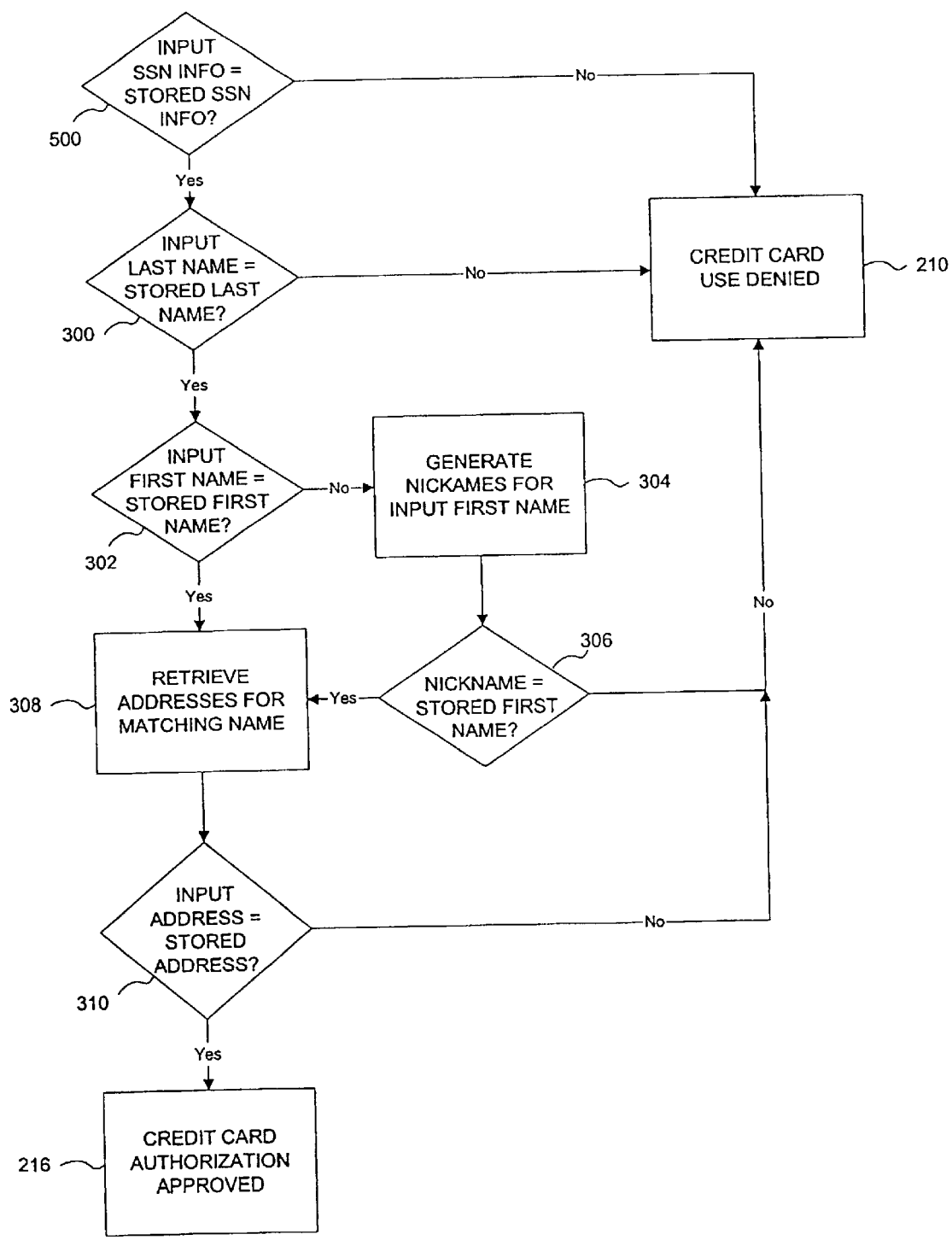
FIG. 5 is an operational block diagram of a method of determining whether information input by a user corresponds to information stored in an independent information database in accordance with another preferred embodiment of the present invention.

Referring now to FIG. 5, the independent database comparison procedure performed in step 214 for the preferred embodiment which utilizes social security number information is illustrated. The comparison procedure is essentially the same as the comparison procedure performed in association with the procedure illustrated in FIG. 3, with the exception that an additional social security number information comparison is performed in step 500. The remaining steps of FIG. 5 are performed equivalently to their similarly numbered respective steps of FIG. 3, and a discussion of these steps will therefore be omitted the discussion of this preferred embodiment. In step 500, the social security number information input by the user is matched against social security number information stored in the independent information database 18. For instance, if the user was prompted into input the last four digits of his social security number, all individuals stored in independent information database 18 containing those last four digits in their social security number will be identified. If no match exists between the user input social security number information and the information stored in independent information database 18, the electronic credit card transaction is denied in step 210. If any matches are found to exist in step 500, the comparison procedure then utilizes the information stored in association with these matches to perform steps 300 through 310 to further determine whether the user input name and address matches the information stored in independent information database 18 in association with matching social security number information.

It is the intention of the inventors of the present invention that various modifications of the procedure shown in FIG. 5 may be performed without departing from the scope and spirit of the present invention, such as only using the social security number information for identifying an individual in the independent information database 18. In such a situation, steps 300–306 would be omitted and addresses which corresponded to the matching social security number information would be retrieved in step 308. Alternatively, the social security number information could be used with only a portion of the user's name, such as the user's last name, as fields of information to identify an individual in the independent information database 18.

By utilizing social security number information, the number of fraudulent electronic credit card transactions allowed can be greatly reduced. Credit cards are typically carried by individuals in their wallets, where other information identifying the individuals is also typically placed within the individual's wallet. For instance, most individuals carry their driver's licenses in their wallets. Therefore, if an individual's wallet is lost or stolen, a person coming into possession of the wallet will have access to both the individual's credit card and personal identification. In order to assist in preventing fraudulent usage of a credit card, one embodiment of the present invention requires the user of the credit card to know social security number information about the credit card holder. Since most people do not carry their social security number on their person, this identifying data will not be readily available to a person who fraudulently comes into possession of a credit card number. While social security number information is utilized in the preferred embodiment of the present invention, it is the intention of the inventors of the present invention that other information which uniquely identifies an individual could also be utilized, such as driver's license numbers or other numbers which are assigned to an individual and only that individual. Again, the user would only be required to input a portion of this uniquely identifying piece of information, as users would always be reluctant to give out their entire uniquely identifying piece of information from a remote site.

Social security number information database 18 and cardholder information database 16 are stored separately from each another and are also accessed separately from each other. If an unauthorized person gains access to credit card information in cardholder information database 16, the unauthorized person will not be able to access the information in social security number information database 18. This prevents the information necessary for authorization of the electronic credit card transaction from being obtained by fraudulently gaining access to one of the information databases. Accessing databases 16 and 18 separately also prevents all of the information necessary for authorization from being obtained if one of the electronic data transmissions is fraudulently intercepted. With the widespread use of on-line computer financial transactions, separate access to databases 16 and 18 is particularly important in preventing fraudulent credit card transactions.

As can be seen, the independent information database is useful in corroborating that the information input by the user is in fact accurate, since the independent information database 18 does not contain information that a user has previously supplied as identifying information about the user. In some instances, a person could provide a credit card issuer with false information, and the person could repeatedly use this false information to satisfy authorization procedures in future credit card transactions. The independent information database 18 is a database containing addresses that were independently gathered to be associated with an individual, where this information is used to determine if it matches the information provided by the user and contained in the credit card database 16. Thus, the present invention matches the information contained in two independent databases in order to authenticate the accuracy of the information provided by the user.

It is also possible for a vendor using electronic credit card processing system 10 of the present invention to limit the amount of expenditures a user may make in a given time period in order to further safeguard against fraudulent transactions. Prior to authorizing the electronic credit card transaction, a threshold check may be performed to ensure that the user has not exceeded a predetermined expenditure limit within a given time period. For example, the user may be limited to certain amount of expenditures each day, each week, each month, etc. The time periods are of the rolling variety where the last given number of days prior to the attempted transaction are monitored for the threshold check. The criteria to be used in each threshold check is determined by the type of goods or services to which the credit card transaction relates. By utilizing an expenditure threshold, the electronic credit card processing system 10 limits the number of fraudulent transactions which may be performed by a user who has obtained all of the necessary information to satisfy the tests for authorization. Placing a limit on the expenditures allowed for an electronic credit card transaction is also useful in preventing "friendly fraud," which occurs when an individual is a valid user of the credit card but has exceeded a limit for the transaction attempted. For instance, where multiple credit cards exist for a certain credit card number, thresholds can be established based on the social security number so that a "global" threshold can be established and upheld for all uses of the credit card. Further, after an electronic credit card transaction has transpired, subsequent use of the same credit card number may be blocked within a predetermined time period by using the social security number as the variable monitored.

As a further fraud detecting measure, the electronic credit card processing system 10 may employ automatic number identification (ANI) blocking in addition to the main authorization procedure. The authorization procedure is substantially the same as the procedure discussed in association with FIG. 2, except that the procedure adds a step where the phone number from which the remote terminal is communicating is automatically collected by central station 12 from the phone provider and stored in memory 22. Further, the collected phone number is compared with a list of blocked phone numbers stored in memory 22 which are not authorized to perform electronic credit card transactions. The electronic credit card transaction is rejected if the collected phone number matches any of the blocked phone numbers on the stored list. All other steps in the authorization procedure are performed as previously described, and their discussion will be omitted from the description of this authorization procedure. ANI blocking can be useful in preventing continued fraudulent use from a particular phone number known to have a large amount of fraudulent use associated therewith, and ANI blocking may be selectively employed to accomplish this result.

The above-described process of collecting data from a user and processing the data to authorize an electronic credit card transaction is automated, and no human intervention is required during the authorization procedure. However, it is understood that the system and method of the present invention may also be employed by vendors who perform in-person credit card transactions with purchasers, where the remote terminal used for inputting the purchaser's information would located at the vendor's store.

As can be seen from the foregoing, the system and method for enhanced fraud detection in automated electronic credit card processing performed in accordance with the present invention will reduce the number of fraudulent electronic credit card transactions while minimizing the number of valid credit card transactions incidentally prevented from being performed. Moreover, the system and method for enhanced fraud detection in automated electronic credit card processing performed in accordance with the present invention will minimize fraudulent use of a credit card by corroborating information provided by a user in two independent databases using reliable information which users are not hesitant to provide to conduct the credit card transaction.

In each of the above embodiments, the different methods of preventing fraudulent credit card transactions by the electronic credit card processing system of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method of authorizing a credit card for transactions, comprising the steps of:

receiving information input by a user, wherein said input information includes credit card information for a credit card being authorized, the user's name and address, and only a portion of a uniquely identifying piece of information about the user;

validating the input information with information stored in a credit card database provided by an issuer of the user's credit card;

accessing a second independent database having a list of individuals stored therein, wherein each of said individuals includes uniquely identifying information stored therewith and further includes at least one address stored therewith corresponding to an address of an individual;

determining whether an individual exists in the second independent database associated with the user input information by locating an individual having uniquely identifying information stored therewith which matches the uniquely identifying piece of information input by the user;

retrieving the at least one stored address from the second independent database associated with an individual found to match the user input information;

comparing the user input address with the at least one retrieved stored address to corroborate the information stored in the credit card database with the information stored in the second independent database; and authorizing the credit card for transactions when said input information is determined to correspond to information stored in both the credit card database and the second independent database.

2. The method of authorizing a credit card for transactions as defined in claim 1, wherein the second independent database is stored separately and independently from the credit card information stored by the issuer.

3. The method of authorizing a credit card for transactions as defined in claim 1, wherein the second independent database further includes a corresponding name stored with each individual, wherein the step of determining whether an individual exists in the second independent database associated with the user input information further comprises determining whether the user input name matches a name stored in the second independent database.

4. The method of authorizing a credit card for transactions as defined in claim 3, wherein the step of determining whether a match exists for an individual stored in the second independent database comprises the steps of:

locating all individuals stored in the second independent database containing uniquely identifying information stored therewith which matches the portion of the uniquely identifying information input by the user; and determining whether one of the located individuals contains a name stored therewith which matches the user input name.

5. The method of authorizing a credit card for transactions as defined in claim 4, wherein the step of determining whether one of the located individuals contains a name stored therewith which matches the user input name comprises the steps of:

determining whether the last name of one of the located individuals matches the last name input by the user; and determining whether the stored first name of an individual found to have matched the user input last name matches the user input first name.

6. The method of authorizing a credit card for transactions as defined in claim 5, wherein when an individual in the second independent database is found to have matched the user input last name but does not match the user input first name, the method further comprising the steps of:

generating at least one nickname for the user input first name; and determining whether the stored first name of an individual found to have matched the user input last name matches the at least one generated nickname.

7. The method of authorizing a credit card for transactions as defined in claim 1, wherein said portion of a uniquely identifying piece of information about the user is a portion of the user's social security number.

8. A method of authorizing a credit card for transactions, comprising the steps of:
   receiving information input by a user, wherein said user input information includes the user's name, credit card information, and address;
   validating the input information with information stored in a credit card database provided by an issuer of the user's credit card;
   accessing a second independent database having a list of individuals' names stored therein, wherein each of said individuals includes at least one address stored therewith corresponding to an address of an individual;
   determining whether an individual exists in the second independent database having information stored therewith which matches the name input by the user;
   retrieving the at least one stored address associated with an individual found to match the user input information;
   comparing the input address with the at least one retrieved stored address to corroborate the information stored in the credit card database with the information stored the second independent database; and
   authorizing the credit card for transactions when said input information is determined to correspond to information stored in both the credit card database and the second independent database.

9. The method of authorizing a credit card for transactions as defined in claim 8, wherein the step of determining whether one of the located individuals contains a name stored therewith which matches the user input name comprises the steps of:
   determining whether the last name of one of the individuals stored in the second independent database matches the last name input by the user; and
   determining whether the stored first name of an individual found to have matched the user input last name matches the user input first name.

10. The method of authorizing a credit card for transactions as defined in claim 9, wherein when an individual in the second independent database is found to have matched the user input last name but does not match the user input first name, the method further comprising the steps of:
   generating at least one nickname for the user input first name; and
   determining whether the stored first name of an individual found to have matched the user input last name matches the at least one generated nickname.

11. The method of authorizing a credit card for transactions as defined in claim 8, further comprising the step of generating a request for a user at the remote terminal to input a portion of a uniquely identifying piece of information about the user;
   wherein each individual in the second independent database includes a portion of uniquely identifying piece of information stored therewith;
   wherein the step of determining whether a match exists in the second independent database further comprises determining whether an individual exists in the second independent database having a portion of uniquely identifying information stored therewith which matches the portion of the uniquely identifying information and the name input by the user.

12. The method of authorizing a credit card for transactions as defined in claim 11, wherein said portion of a uniquely identifying piece of information about the user is a portion of the user's social security number.

13. An automated system for authorizing a credit card for transactions, comprising:
   receiving means receiving information input by a user, wherein said input information includes credit card information for a credit card being authorized, the user's name and address, and only a portion of a uniquely identifying piece of information about the user;
   comparing means for comparing the input information with information stored in a credit card information database provided by an issuer of the user's credit card to determine whether the input information is valid;
   determining means for accessing a second independent database of stored individuals having at least one corresponding address and a corresponding portion of a uniquely identifying piece of information stored with each individual and determining whether an individual exists in the second independent database having information stored therewith which matches the portion of the uniquely identifying piece of information input by the user;
   retrieval means for retrieving the at least one stored address associated with an individual found to match the user input information;
   processing means for comparing the user input address with the at least one retrieved stored address from the second independent database to corroborate the information stored in the credit card information database; and
   authorizing means for authorizing the credit card for transactions when said input information is determined to correspond to the retrieved information stored in both the credit card information database and the second independent database.

14. The automated system for authorizing a credit card for transactions as defined in claim 13, wherein the second independent database is stored separately and independently from the credit card information stored by the issuer.

15. The automated system for authorizing a credit card for transactions as defined in claim 13, wherein the second independent database further includes a name stored with each corresponding individual, wherein said determining means further determines whether an individual exists in the second independent database associated with the name input by the user.

16. The automated system for authorizing a credit card for transactions as defined in claim 15, wherein each individual in the second independent database includes corresponding uniquely identifying information stored therewith, wherein said determining means further:
   determines all individuals stored in the second independent database containing a portion of uniquely identifying information stored therewith which matches the portion of the uniquely identifying information input by the user; and
   determines whether one of the located individuals contains a name stored therewith which matches the user input name.

17. The automated system for authorizing a credit card for transactions as defined in claim 16, wherein when determining whether one of the located individuals contains a name stored therewith which matches the user input name, said determining means further:

determines whether the last name of one of the located individuals matches the last name input by the user; and determines whether the stored first name of an individual found to have matched the user input last name matches the user input first name.

18. The automated system for authorizing a credit card for transactions as defined in claim 17, wherein when an individual in the second independent database is found to have matched the user input last name but does not match the user input first name, said determining means further:

generates at least one nickname for the user input first name; and determines whether the stored first name of an individual found to have matched the user input last name matches the at least one generated nickname.

19. The automated system for authorizing a credit card for transactions as defined in claim 13, wherein said portion of uniquely identifying piece of information about the user is a portion of the user's social security number.

20. An automated system for authorizing a credit card for transactions, comprising:

receiving means receiving information input by a user, wherein said input information includes the user's name, credit card information, and address;

comparing means for comparing the input information with information stored in a credit card information database provided by an issuer of the user's credit card to determine whether the input information is valid;

determining means for accessing a second independent database of stored individuals having at least one address stored therewith corresponding to an address of an individual identified by the individual's name and determining whether an individual exists in the second independent database having a name stored therewith which matches the name input by the user;

retrieval means for retrieving the at least one stored address associated with an individual found to match the user input information;

processing means for comparing the input address with the at least one retrieved stored address from the second independent database and corroborating the information stored in the credit card information database; and authorizing means for authorizing the credit card for transactions when said input information is determined to correspond to the retrieved information stored in both the credit card information database and the second independent database.

21. The automated system for authorizing a credit card for transactions as defined in claim 20, wherein the second independent database is stored separately and independently from the credit card information stored by the issuer.

22. The automated system of authorizing a credit card for transactions as defined in claim 20, wherein when determining whether one of the individuals stored in the second independent database matches the user input name, said determining means further:

determines whether the last name of any of the individuals matches the last name input by the user; and determines whether the stored first name of an individual found to have matched the user input last name matches the user input first name.

23. The automated system of authorizing a credit card for transactions as defined in claim 22, wherein when an individual in the second independent database is found to have matched the user input last name but does not match the user input first name, said determining means further:

generates at least one nickname for the user input first name; and determines whether the stored first name of an individual found to have matched the user input last name matches the at least one generated nickname.

24. The automated system for authorizing a credit card for transactions as defined in claim 20, wherein said inquiry means further requests the user to input a portion of a uniquely identifying piece of information about the user;

wherein said determining means further:

locates all individuals stored in the second independent database containing a portion of a uniquely identifying piece of information stored therewith which matches the portion of the uniquely identifying piece of information input by the user; and determines whether one of the located individuals contains a name stored therewith which matches the user input name.

25. The automated system for authorizing a credit card for transactions as defined in claim 24, wherein said portion of uniquely identifying piece of information about the user is a portion of the user's social security number.

* * * * *